United States Patent Office 3,580,702
Patented May 25, 1971

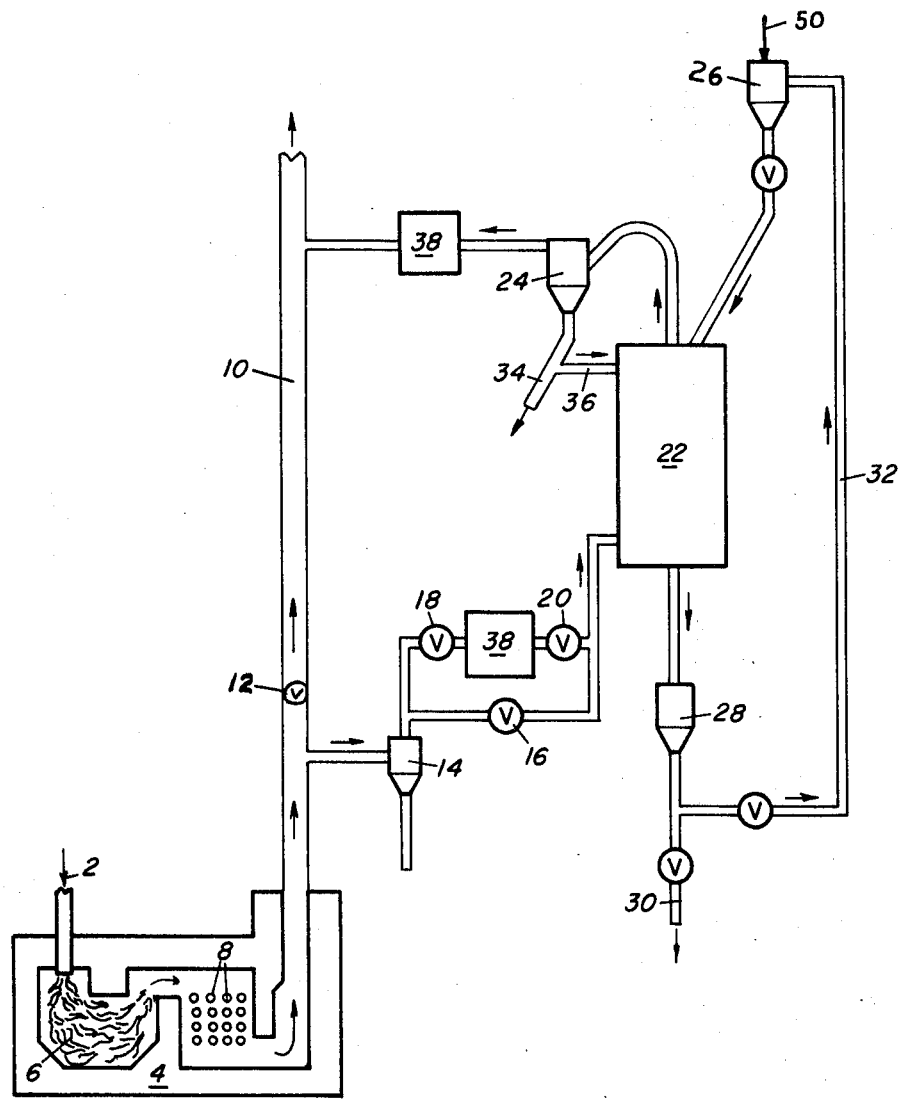

3,580,702
METHOD OF REMOVING SULFUR OXIDES FROM GASES
John G. Myers and Joseph H. Field, Pittsburgh, Pa., assignors to the United States of America as represented by the Secretary of the Interior
Filed Sept. 10, 1968, Ser. No. 758,723
Int. Cl. B01d 53/34
U.S. Cl. 23—25                              5 Claims

ABSTRACT OF THE DISCLOSURE

Sulfur oxides are removed from gases by contacting the same at elevated temperatures with a dry absorbent selected from the group consisting of red mud, retorted oil shale, retorted oil shale treated with sodium hydroxide and mixtures of retorted oil shale and red mud treated with sodium hydroxide. These absorbents may be used on a once-through basis or they may be regenerated. Catalytic oxidation of the gases, though not necessary, may precede contact with the absorbents.

---

This invention resulted from work done by the Bureau of Mines of the Department of the Interior, and the domestic title to the invention is in the Government.

BACKGROUND OF THE INVENTION

Field of invention

This invention relates to the gas purification art. More particularly, it relates to a method of using novel absorbents to remove sulfur oxides from gases. Large amounts of sulfur oxides in the form of sulfur dioxide and sulfur trioxide are released to the atmosphere as a result of the combustion of sulfur containing coal and oil. Other sources of sulfur oxide emissions include water gases, smelter gases, petroleum and tar distillation gases, sulfuric acid plant effluents, Claus plant effluents and gases produced in paper manufacture.

It is generally recognized that the release to the atmosphere of large amounts of sulfur oxides is highly undesirable and represents a major air pollution hazard.

Description of the prior art

Previous well known methods for removing sulfur oxides from gases include, the addition of caustic agents to the gases, the attempted oxidation of sulfur dioxide to sulfur trioxide with subsequent absorption by conventional means, the reduction of sulfur oxides to sulfur, wet absorption, adsorption and dry absorption with agents such as sodium aluminate or alkalized alumina. For various reasons, none of these well known prior techniques has gained wide acceptance as an economical and practical means of solving the problem of sulfur oxide emissions. As a result, there remains in the art a need for an efficient and economical method of removing sulfur oxides from flue gases.

SUMMARY

We have now discovered that sulfur oxides such as sulfur dioxide and sulfur trioxide can be efficiently and economically removed from flue gases by contacting those gases at elevated temperatures with a dry absorbent from the group consisting of red mud, retorted oil shale, à retorted oil shale treatment with sodium hydroxide or a mixture of red mud and retorted oil shale treated with sodium hydroxide.

Accordingly, the objects of the present invention are:
To provide improved absorbents for use in the removal of sulfur oxides from gases, and
To provide improved processes wherein novel absorbents are used to remove sulfur oxides from hot gases.

These and other objects and advantages of the invention will become apparent from a consideration of the following description of the preferred embodiments and accompanying figure and specific illustrations.

BRIEF DESCRIPTION OF THE DRAWING

The accompanying figure is a schematic drawing illustrating a process for the removal of sulfur oxides from flue gases.

DESCRIPTION OF THE PREFERRED EMBODIMENTS

Absorbents

A novel group of absorbents have been prepared. The absorbents of this group are both effective and economic in their removal of sulfur oxides such as sulfur dioxide and sulfur trioxide from gases. The group consists of red mud, retorted oil shale, retorted oil shale treated with sodium hydroxide and mixtures of retorted oil shale and red mud treated with sodium hydroxide.

The term "red mud" as used herein refers to the insoluble waste product resulting from the leaching of a bauxite ore with sodium hydroxide. These waste products have been given various means depending upon the source of the bauxite ore and the nature of the leaching process. Consequently, it is intended that the term "red mud" as used herein include the waste products sometimes refered to as "brown mud" and "black sand." The following table shows typical compositions for various red muds.

|  | Weight, percent | | | |
|---|---|---|---|---|
|  | U.S. Pat. 3,298,781 | Jamaican red mud[1] | | Brown mud[2] | Black sand[2] |
|  |  | Sample (a) | Sample (b) |  |  |
| Component: | | | | | |
| $Al_2O_3$ | 18.9 | 23.0 | 28.7 | 8.1 | 22.0 |
| $Na_2O$ | 8.3 | 3.84 | 4.2 | 4.5 | 5.4 |
| $SiO_2$ | 17.4 | 3.92 | 3.43 | 22.4 | 18.1 |
| $Fe_2O_3$ | 39.3 | 39.1 | 43.1 | 8.1 | 32.0 |
| $TiO_2$ | 2.8 | 6.4 | 0.65 | 4.0 | 4.3 |
| CaO |  | 1.57 | 6.24 | 45.7 | 2.7 |
| MgO |  | 0.21 |  |  |  |
| Loss on ignition | 10.5 | 16.2 |  | 5.7 | 13.8 |

[1] From Jamaican bauxite.
[2] From Arkansas bauxite.

It is seldom that the sodium oxide content of red mud exceeds 5 weight percent and only rarely does it exceed 8.5–9.0 weight percent.

The term "retorted oil shale" refers to oil shale having substantially all volatile matter removed. Normally such a removal is accomplished by a thermal process wherein the organic matter termed kerogen is driven off with heat. Large deposits of oil shale are present in Australia, Canada, Germany, Manchuria, South Africa, Spain, Sweden and the states of Colorado, Utah and Wyoming in the United States. Increasing amounts of shale oil are being retorted to recover the organic material having large amounts of retorted shale oil waste. Although the mineral content of this waste varies with the source, a typical analysis is given in the following table.

Mineral composition of shale-oil

| | |
|---|---|
| Carbonates, principally dolomite | 48 |
| Feldspars | 21 |
| Quarts | 13 |
| Clays, principally illite | 13 |
| Analcite | 4 |
| Pyrite | 1 |
| Total | 100 |

Often these shales contain minerals such as dawsonite, nacholite or shortite.

Retorted oil shale impregnated with NaOH can also be used as an absorbent. The amount of sodium hydroxide in the mixture can be from 10 to 50 weight percent although a 2/1 weight ratio of oil shale to sodium hydroxide is preferred. A mixture of retorted oil shale and red mud treated with sodium hydroxide is also a good absorbent. In this combination each of the ingredients may be present in the range of from about 10–50 weight percent.

Preparation of absorbents

Red mud and retorted oil shale are normally available as powdered solids. In some forms of contact such as direct injection into a gas stream they can be used in the powdered form. The powders are amenable to conventional working to produce larger sized pellets or aggregates where these forms are more suitable. Red mud is also available in slurry form and may be used as such in at least one embodiment of this invention.

With sodium hydroxide oil shale combinations, the oil shale can first work into the desired physical form for contact such as pellets or spheres, and then impregnated with a sodium hydroxide solution. This is a particularly good method for combinations of low sodium hydroxide content for example 5% or less. An alternate method consists of mixing a concentrated sodium hydroxide solution with powdered oil shale and concentrating the slurry to obtain a paste which can be dried or extruded into the desired size and shape absorbent.

The combination of sodium hydroxide-retorted oil shale-red mud can be prepared by the same methods as the sodium hydroxide retorted oil shale combination.

Use of the absorbents

The absorbents of this invention have wide application in the removal of sulfur oxides such as sulfur dioxide and sulfur trioxide from gases containing the same. The term "sulfur oxides" as used herein refers to inorganic acidic sulfur oxides and more particularly, sulfur dioxide, sulfur trioxide or mixtures of sulfur dioxide and sulfur trioxide.

The invention is not limited by the sulfur oxide content of the gases treated. Sulfur oxides can be removed from gases having trace or very large sulfur oxide contents. Generally however, the absorbents will find utility in the removal of sulfur oxides from process gases having from about 0.1 to 10 percent sulfur oxide content. The attached figure is illustrative of the major embodiments contemplated. That figure shows the removal of sulfur oxides from flue gases resulting from the combustion of a sulfur containing fuel in a furnace. Thus, a fuel and air mixture 2 is supplied to furnace 4 where they are burned to produce combustion gases 6 from which heat energy is extracted by steam tubes 8. The gases are then passed to stack 10 through which they would normally be vented to the atmosphere. In the embodiment shown, valve 12 prevents direct release to the atmosphere of the sulfur oxide containing gases. Instead, they are passed to cyclone 14 where any particulate matter present in the gases are removed. From that point, the gases may be alternate routes depending upon the position of valves 16, 18 and 20. Assuming for the moment that valves 18 and 20 are closed and valve 16 is open, the gases then pass directly to absorber 22. In the absorber shown, the gases pass upwardly through the unit and exit to separator 24. Absorbent 50 enters the system in hopper 26. From that hopper it is fed to absorber 22 where it passes downwardly and in countercurrent relation to the flue gases. Absorbent passes from unit 22 to hopper 28. From there, a portion 30 is led from the system and a second portion is recycled via line 32 to hopper 26. Flue gases leaving absorber 22 are passed to separator 24 where any entrained absorbent is removed. The absorbent fines collected in separator 24 can be rejected as by line 34 or they can be recycled to absorber 22 as by line 36. Flue gases leaving separator 24 are passed to a heat exchanger 38 where any remaining usable heat is withdrawn and then to stack 10 for release to the atmosphere. Absorption of sulfur oxides according to this invention generally takes place in the temperature range of from 300–600° C. The preferred operating range for absorption when the sulfur oxide content of the gas consists primarily of sulfur dioxide is in the range of from 450–600° C. when red mud or oil shale are used. Preferred temperatures for $SO_2$ absorption using absorbents of added sodium content are lower as these absorbents reach high activity at lower temperatures. Thus, absorbents show activity at temperatures as low as room temperature up to 600° C. Lower temperatures, even down to room temperature, can be used to absorb sulfur trioxide as it is readily absorbed by all the absorbents. The form of contact used in the absorption step is not critical. Consequently, any of the standard forms of dilute phase and fixed bed contact may be practiced. Parameters such as bed size, time of contact and space velocities are a matter of design and are not critical to the operation.

One alternative to the above described system involves closing valve 16 and opening valves 18 and 20 so that the gases pass through catalytic oxidation unit 38 prior to entering absorption unit 22. In this manner a large portion of the $SO_2$ content of the gases is converted to $SO_3$. Since sulfur trioxide is much easier to absorb than sulfur dioxide, the inventory of absorbent in unit 22 can be reduced. We have found that not only are conventional sulfur oxidation catalysts such as vanadium oxide and platinum useful in unit 38, but that red mud and retorted oil shale may also be used as a catalyst for the oxidation of $SO_2$ or $H_2O$. Any of the absorbents of this invention may be used or mixtures thereof following a catalytic oxidation to absorb $SO_3$.

The absorbents can also be utilized by injection them as a powder into the furnace gases and then removing the powder from the flue gas in a cyclone or electrostatic precipitator.

Oil shale may be beneficially employed in its raw unretorted state. In this form, the oil shale can be burned with the fuel and the residue recovered from the flue gases.

Regeneration of absorbents

Although the absorbents of this invention are made from cheap and readily obtainable materials they derive an extra advantage through their ability to undergo regeneration. All of the absorbents can be regenerated by contact with a reducing gas at temperatures in the range of from 500° C. to 1000° C., preferably from 600° C. to about 850° C. Reducing gases contemplated include, hydrogen, flue gas, reformed gas, producer gas or water gas. After regeneration the absorbents can be recycled to the absorber for further use. When regenerating with a reducing gas, $H_2S$ is formed which, if desired, can be further processed, as for example by the claus process, to produce valuable sulfur products.

Red mud and oil shale can also be regenerated by heating in air to above 600° C., preferably 600°–900° C. The sodium hydroxide impregnated absorbents can not be regenerated in this manner. We have found that an activation with hydrogen after an air regeneration of red mud or oil shale is desirable. This activation can take place at temperatures of from 100° C. to regeneration temperatures. The manner in which the absorbents are used will depend upon design considerations for each application. In all instances however, the absorbents of the present invention enjoy the advantages resulting from their low cost, ease of preparation, hardness and high capacity.

The following examples are illustrative of absorbents prepared according to this invention. In each instance, unless otherwise noted, absorptive capacity was tested using a simulated flue gas of having a composition of:

| | Percent |
|---|---|
| $SO_2$ | 0.316 |
| $H_2O$ | 6.700 |
| $CO_2$ | 13.000 |
| $O_2$ | 6.000 |
| $N_2$ | 73.984 |

Also, in each absorption run, the flue gas had an hourly space velocity of 1050 hr.$^{-1}$.

EXAMPLE 1

A powdered red mud waste from Aluminum Company of America Mobile, Alabama plant resulting from the processing of Surinam bauxite is extruded to form absorbent granules. This absorbent was contacted with the simulated flue gas for intervals at 130° C., 330° C., 450° C., 500° C. and 550° C. A 90% $SO_2$ removal was achieved at each interval. At 130° C. it had a loading capacity 2.0 grams $SO_2$/100 grams of absorbent; at 330° C. it had a capacity of 4.3 grams $SO_2$/100 grams absorbent; at 450° C. it had a capacity of 9.9 grams $SO_2$/100 grams absorbent; at 500° C. it had a capacity of 17.1 grams $SO_2$/100 grams absorbent and at 550° C. it had a capacity 29.8 grams $SO_2$/100 grams absorbent.

EXAMPLE 2

A powdered red mud waste from Reynolds Aluminum Company Sherwin plant resulting from the processing of a mixed 75% Jamaican 25% Haiti bauxite was extruded to form absorbent granules. This absorbent was contacted with the simulated flue gas for intervals at 130° C., 350° C., 450° C. and 500° C. A 90% $SO_2$ removal was achieved at each interval with loading capacities of 1.4 grams $SO_2$/100 grams absorbent at 130° C.; 2.4 grams $SO_2$/100 grams absorbent at 330° C.; 17.0 grams $SO_2$/100 grams absorbent at 450° C. and 25.0 grams $SO_2$/100 grams absorbent at 500° C.

EXAMPLE 3

A red mud waste from Kaiser Corporation's Baton Rouge plant resulting from the processing of Jamaican bauxite was extruded to form absorbent granules. This absorbent was contacted with the simulated flue gas for intervals at 130° C., 330° C., 450° C. and 500° C. A 90% $SO_2$ removal was achieved at each interval with loading capacities of 4.0 grams $SO_2$/100 grams absorbent at 130° C.; 4.0 grams $SO_2$/100 grams absorbent at 330° C.; 7.1 grams $SO_2$/100 grams absorbent at 450° C. and 18.4 grams $SO_2$/100 grams absorbent at 500° C.

EXAMPLE 4

Spent absorbent from Example 3 was used to absorb sulfur oxides from the simulated flue gas for 3 absorption-regeneration cycles. Regeneration was with $H_2$ at 630–650° C. On the fourth absorption and at 90% $SO_2$ removal from the flue gas, this absorbent had the loading capacities of 0.8 gram $SO_2$/100 grams absorbent at 130° C.; 4.6 grams $SO_2$/100 grams absorbent at 450° C. and 21.1 grams $SO_2$/100 grams absorbent at 500° C.

EXAMPLE 5

A powdered brown mud waste (Reynolds Metals Co. No. ARD67–377) was extruded to form absorbent granules. This absorbent was contacted with the simulated flue gas for intervals at 130° C., 330° C., 450° C., 500° C., and 550° C. At a 90% $SO_2$ removal for each interval it had absorptive capacities of 2.1 grams $SO_2$/100 grams absorbent at 130° C.; 3.7 grams $SO_2$/100 grams absorbent at 330° C.; 12.4 grams $SO_2$/100 grams absorbent at 450° C.; 15.2 grams $SO_2$/100 grams absorbent at 500° C.; and 19.3 grams $SO_2$/100 grams absorbent at 550° C.

EXAMPLE 6

A black sand, (Reynolds Metal Co. No. 67–378) in granule form was contacted with the simulated flue gas for intervals at 130° C., 330° C., 450° C., 500° C., and 550° C. At a 90% $SO_2$ removal for each interval the absorptive capacities were 1.9 grams $SO_2$/100 grams absorbent at 130° C.; 2.7 grams $SO_2$/100 grams absorbent at 330° C.; 5.4 grams $SO_2$/100 grams absorbent at 450° C.; 9.3 grams $SO_2$/100 grams absorbent at 500° C. and 11.7 grams $SO_2$/100 grams absorbent at 550° C.

EXAMPLE 7

A core of oil shale was obtained from Mobil Oil Company core hole number 1 drilled in section 14, T6, S, RW, in Garfield County Colorado. This core was retorted in a muffle furnace at 630° C. for eight hours. The oil yield was 40.9 gallons/ton. The retorted core was crushed to 8–16 sieve, and contacted with the simulated flue gas for intervals at temperatures of 450° C. 500° C., 550° C. and 600° C. A 90% $SO_2$ removal was obtained at each interval. At 450° C. it loading capacity was 10.5 grams $SO_2$/100 grams absorbent; at 500° C. its capacity was 14.2 grams $SO_2$/100 grams absorbent; at 550° C. its capacity was 16.8 grams $SO_2$/100 grams absorbent and at 600° C. its capacity was 20.6 grams $SO_2$/100 grams absorbent.

EXAMPLE 8

A powdered retorted oil shale produced as waste product from the extraction of oil from shale by the oil shale company was dried 16 hours at 200° C. and formed into 3/16" pellets. This absorbent was contacted with the simulated flue gas for intervals at 450° C., 500° C., and 600° C. A 90% $SO_2$ removal was obtained at each interval. At 450° C. this absorbent had loading capacity of 1.8 grams $SO_2$/100 grams absorbent. At 500° C. 8.4 grams $SO_2$/100 grams absorbent; 17.0 grams $SO_2$/100 grams absorbent at 550° C. and 20.5 grams $SO_2$/100 grams absorbent at 600° C.

EXAMPLE 9

A core of oil shale containing shortite was obtained from Big Island core hole number 23 in the Green River formation in Colorado. This retorted in a muffle furnace at 600° C. for 10 hours. The core was then crushed to 8–16 sieve and contacted with the simulated flue gas for intervals at 450° C., 500° C., 550° C. and 600° C. A 90% $SO_2$ removal was obtained at each interval. At 450° C. its capacity was 5.1 grams $SO_2$/100 grams absorbent. At 500° C., its capacity was 8.4 grams $SO_2$/100 grams absorbent; at 550° C. its capacity was 8.4 grams $SO_2$/100 grams absorbent and at 600° C. its capacity was 10.4 grams $SO_2$/100 grams absorbent.

EXAMPLE 10

The spent absorbent from Example 9 was regenerated by treatment with $H_2$ at 630–650° C., for 16 hours. This regenerated absorbent was contacted with the simulated flue gas for intervals at 130° C., 330° C., 450° C., 500° C., 550° C. and 600° C. At 90% $SO_2$ removal for each interval, the absorptive capacities were 0.6 gram $SO_2$/100 grams absorbent at 130° C.; 2.8 grams $SO_2$/100 grams absorbent at 330° C.; 7.5 grams $SO_2$/100 grams absorbent at 450° C.; 10.5 grams $SO_2$/100 grams absorbent at 500° C.; 12.2 grams $SO_2$/100 grams absorbent at 550° C. and 14.00 grams $SO_2$/100 grams absorbent at 600° C.

EXAMPLE 11

A retorted oil shale from the Piceance Creek Basin in Colorado was crushed to 8016 sieve and pretreated first with air at 630° C. for 20 hours and then with $H_2$ at 630–650° C. for 10 hours. This absorbent was then contacted with simulated flue gas at 600° C. The loading capacity of this absorbent was at 90% $SO_2$ removal was 8.1 grams $SO_2$/100 grams absorbent.

EXAMPLE 12

Spent absorbent from Example 11 was regenerated by treatment with $H_2$ at 630–650° C. for 20 hours. This regenerated absorbent was contacted with the simulated flue gas at 600° C. The loading capacity at 90% $SO_2$ removal was 8.3 grams $SO_2$/100 grams absorbent.

EXAMPLE 13

Spent absorbent from Example 12 was regenerated by treatment with hydrogen at 630–650° C. for 20 hours. This regenerated absorbent was contacted with the simulated flue gas at 600° C. The loading capacity at 90% $SO_2$ removal was 8.9 grams $SO_2$/100 grams absorbent.

EXAMPLE 14

The spent absorbent from Example 13 was regenerated by treatment with $H_2$ at 630°–650° C. for 20 hours. This regenerated absorbent was contacted with the simulated flue gas at 600° C. This loading capacity at 90% $SO_2$ removal was 8.9 grams $SO_2$/100 grams absorbent.

EXAMPLE 15

NaOH was mixed with retorted oil shale in a 1/1 weight ratio; dried at 185° C. for 16 hours and crushed to 8–16 mesh. This absorbent was then contacted with the simulated flue gas for intervals at 130° C. and 330° C. At 90% $SO_2$ removal, the absorptive capacities was 3.78 grams $SO_2$/100 grams absorbent at 130° C. and 14.16 grams $SO_2$/100 grams absorbent at 330° C.

EXAMPLE 15A

Spent absorbent from Example 15 was regenerated by treatment with $H_2$ at 630°–650° C. for 16 hours. This regenerated absorbent was contacted with simulated flue gas at 330° C. At 90% $SO_2$ removal the absorptive capacity was 4.03.

EXAMPLE 16

Retorted oil shale was mixed with NaOH in a 2/1 weight ratio, heated at 185° C. for 16 hours and crushed to 8–16 mesh. This absorbent was then contacted with the simulated flue gas for intervals at 130° C. and 330° C. At 90% $SO_2$ removal the absorptive capacities were 9.61 $SO_2$/100 grams absorbent at 130° C. and 16.99 grams $SO_2$/100 grams absorbent at 330° C.

EXAMPLE 17

Spent absorbent from Example 16 was regenerated by treatment with $H_2$ at 650° C. for 16 hours. This regenerated absorbent was contacted with the simulated flue gas at 330° C. At 90% $SO_2$ removal this regenerated absorbent had a loading capacity of 8.20 grams $SO_2$/100 absorbent.

EXAMPLE 18

Spent absorbent from Example 17 was regenerated by treatment with $H_2$ at 630–650° C. for 16 hours. This regenerated absorbent was then contacted with the simulated flue gas for intervals at 130° C. and 330° C. At 90% $SO_2$ removal for both intervals, the absorbent had loading capacities of 2.56 grams $SO_2$/100 grams absorbent at 130° C. and 10.07 grams $SO_2$/100 grams absorbent at 330° C.

EXAMPLE 19

300 grams of retorted oil shale were mixed with 60 grams of sodium hydroxide and 75 grams of water, dried at 185° C. and crushed to 8–16 mesh. This absorbent was then contacted with the simulated flue gas at 330° C. At 90% $SO_2$ removal the absorptive capacity was 6.4 grams $SO_2$/100 grams absorbent.

EXAMPLE 20

300 grams of retorted oil shale were mixed with 100 grams of sodium hydroxide and 225 grams of water, dried at 185° C. and crushed to 8–16 mesh. This absorbent was contacted with the simulated flue gas at 330° C. At 90% $SO_2$ removal, the absorptive capacity was 11.2 grams $SO_2$/100 grams absorbent.

EXAMPLE 21

Spent absorbent from Example 20 was regenerated by treatment with $H_2$ at 630–650° C. for 16 hours. This regenerated absorbent was contacted with the simulated flue gas at 330° C. At 90% $SO_2$ removal the absorptive capacity was 6.4 grams $SO_2$/100 grams absorbent.

EXAMPLE 22

300 grams of retorted oil shale were mixed with 150 grams of sodium hydroxide and 250 grams of water, dried at 185° and crushed to 8–16 mesh. This absorbent was then contacted with the simulated flue gas at 330° C. At 90% $SO_2$ removal the absorptive capacity was 17.0 grams $SO_2$/100 grams absorbent.

EXAMPLE 23

Spent absorbent from Example 22 was regenerated by treatment with 630°–650° C. for 16 hours. This regenerated absorbent was contacted with the simulated flue gas at 330° C. At 90% $SO_2$ removal the absorptive capacity was 8.2 grams $SO_2$/100 grams absorbent.

EXAMPLE 24

Spent absorbent from Example 23 was regenerated by treatment with $H_2$ at 630°–650° C. for 16 hours. This regenerated absorbent was contacted with simulated flue gas at 330° C. At 90% $SO_2$ removal the absorptive capacity was 10.1 grams $SO_2$/100 grams absorbent.

EXAMPLE 25

172 grams of retorted oil shale were mixed with 172 grams of sodium hydroxide and 100 grams of water, dried at 185° C. for 16 hours and crushed to 8–16 mesh. This absorbent was then contacted with the simulated flue gas at 330° C. At 90% $SO_2$ removal the absorptive capacity was 14.2 grams $SO_2$/100 grams absorbent.

EXAMPLE 26

Spent absorbent from Example 25 was regenerated by treatment with $H_2$ at 630°–650° C. for 16 hours. This regenerated absorbent was contacted with the simulated flue gas at 330° C. At 90% $SO_2$ removal the absorptive capacity was 4.0 grams $SO_2$/100 grams absorbent.

EXAMPLE 27

125 grams of retorted oil shale were mixed with 125 grams of red mud, 125 grams of sodium hydroxide and 175 grams of water, dried at 185° C. and crushed to 8–16 mesh. This absorbent was then contacted with the simulated flue gas at 330° C. At 90% $SO_2$ removal the absorptive capacity was 14.3 grams $SO_2$/100 grams absorbent.

EXAMPLE 28

Spent absorbent from Example 27 was regenerated by treatment with reformed gas at 630°–650° C. for 16 hours. This regenerated absorbent was then contacted with the simulated flue gas at 330° C. At 90% $SO_2$ removal the absorptive capacity was 11.0 grams $SO_2$/100 grams absorbent.

EXAMPLE 29

50 grams of retorted oil shale were mixed with 150 grams of red mud, 100 grams of sodium hydroxide and 150 grams of water, dried at 200° C. and crushed to 8–16 mesh. This absorbent was then contacted with simulated flue gas at 330° C. At 90% $SO_2$ removal the absorptive capacity was 7.0 grams $SO_2$/100 grams absorbent.

EXAMPLE 30

Spent absorbent from Example 29 was regenerated by treatment with reformed gas at 630°–650° C. This regenerated absorbent was then contacted with the simulated flue gas at 330° C. At 90% removal the absorptive capacity was 6.4 grams SO₂/100 grams absorbent.

EXAMPLE 31

150 grams of retorted oil shale were mixed with 50 grams red mud, 100 grams sodium hydroxide and 150 grams of water, dried at 200° C. for 16 hours and crushed to 8–16 mesh. This absorbent was then contacted with the simulated flue gas at 330° C. At 90% removal the absorptive capacity was 13.3 grams SO₂/100 grams absorbent.

EXAMPLE 32

Spent absorbent from Example 31 was regenerated by treatment with reformed gas at 630°–650° C. for 16 hours. This regenerated absorbent was then contacted with the simulated flue gas at 330° C. At 90% SO₂ removal the absorptive capacity was 7.6 grams SO₂/100 grams absorbent.

The above examples illustrate various absorbents, their capacities, and their ability to undergo regeneration. It should be noted that heretofore in the disclosure and examples the absorbents with added sodium content have been described in terms of sodium hydroxide as they were all formed from mixtures of sodium hydroxide with either oil shale or mixtures of oil shale and red mud. While such a description is accurate in terms of method of manufacture, it is not believed that all the added sodium content of the absorbent as used, particularly after treatment with a reducing agent, remains in the hydroxide form. Consequently it is more accurate to refer to sodium content. Hence as used, absorbents consisting of oil shale or mixtures of oil shale and red mud treated with sodium may have an added sodium content of from about 5 to 30 weight percent.

While the invention has been described in terms of preferred embodiments and specific examples it will be apparent to those in the art that many modifications and adaptations of the invention are possible without departing from the spirit and scope of the invention as described in the claims below.

What is claimed is:

1. A process for the removal of $SO_2$ and $SO_3$ from gases containing the same comprising bringing said gases into contact at a temperature of from about 300° C. to about 600° C. with a dry absorbent comprising red mud.

2. The method of claim 1 wherein said gases first pass through a catalyst bed wherein substantially all of any sulfur dioxide in said gas is converted to sulfur trioxide and wherein said temperature of contact with said absorbent is in the range of from room temperature to 600° C.

3. The method of claim 2 wherein said catalyst is selected from the group consisting of red mud and retorted oil shale.

4. The method of claim 1 wherein said absorbent is regenerated after said contact by treatment with a reducing gas at temperatures of from 500° C. to 1000° C.

5. The process of claim 1 in which said absorbent is in admixture with retorted oil shale or retorted oil shale having an added sodium content of from about 5 to about 30 weight percent.

References Cited

UNITED STATES PATENTS

| | | | |
|---|---|---|---|
| 2,090,142 | 8/1937 | Nonhebel et al. | 23—2 |
| 3,298,781 | 1/1967 | Fukuma et al. | 23—2X |
| 3,311,449 | 3/1967 | Atsukawa et al. | 23—182X |
| 3,320,906 | 5/1967 | Domahidy | 23—2X |
| 3,475,121 | 10/1969 | Thornton et al. | 23—2X |

EARL C. THOMAS, Primary Examiner

U.S.Cl.X.R.

23—174, 178S